(12) United States Patent
Kamiya et al.

(10) Patent No.: US 6,550,940 B2
(45) Date of Patent: Apr. 22, 2003

(54) LIGHTING DEVICE

(75) Inventors: Takayuki Kamiya, Nishikasugai-gun (JP); Hiroshi Ito, Nishikasugai-gun (JP); Akihiro Misawa, Nishikasugai-gun (JP)

(73) Assignee: Toyoda Gosei Co,., Ltd., Nishikasugai-gun (JP)

( * ) Notice: Subject to any disclaimer, the term of this patent is extended or adjusted under 35 U.S.C. 154(b) by 0 days.

(21) Appl. No.: 09/915,270

(22) Filed: Jul. 27, 2001

(65) Prior Publication Data

US 2002/0012247 A1 Jan. 31, 2002

(30) Foreign Application Priority Data

Jul. 28, 2000 (JP) ........................................ 2000-229792

(51) Int. Cl.$^7$ ................................................. F21V 5/00
(52) U.S. Cl. ...................................... 362/327; 362/308
(58) Field of Search ................................. 362/308, 327, 362/326, 335, 351, 355, 361, 800

(56) References Cited

FOREIGN PATENT DOCUMENTS

JP         09-272377         10/1997

*Primary Examiner*—Stephen Husar
*Assistant Examiner*—Bao Truong
(74) *Attorney, Agent, or Firm*—McGinn & Gibb, PLLC

(57) ABSTRACT

A lighting device has an LED light source and a lens. The lens includes a light emitting surface arranged substantially parallel to a wall of a container when the device is attached to the wall, and a first light receiving surface. The first light receiving surface receives light that is emitted from the LED light source in a direction slanted with respect to the light emitting surface, and takes a concave surface configured such that a distance of the first light receiving surface to the light emitting surface increases from one end to the other end of the lens. The LED light source is disposed while being confronted with one end part of the lens.

9 Claims, 6 Drawing Sheets

LIGHTING DEVICE

CROSS REFERENCE TO THE RELATED APPLICATION

This application is based on the Japanese Patent Application No. 2000-229792, which is incorporated herein by reference.

BACKGROUND OF THE INVENTION

1. Field of the Invention

The present invention relates to a lighting device which is attached to a storage box, such as a console box or a glove box, installed to a cabin of an automobile.

2. Description of the Related Art

A storage box, such as a console box or a glove box, is installed to a cabin of an automobile. Such small articles as cassette tapes, CDs and MDs, maps, and others are stored in the storage box. Sometimes a cup holder is incorporated into the console box.

When the cabin is dark at night, for example, the inside of the console box is also dark. Accordingly, it is difficult for a person to take desired small articles out of the box and store them into the box, and to handle the cup holder. To avoid this, a common practice is to illuminate the console box or the like to make it easy to visually confirm them. There is proposed a lighting device as shown in FIG. 8. A lighting device 100 is attached to a position near the upper end of a side wall 110 of a console box. An inside of the console box is illuminated with light emitted from a light emitting diode 101 through a lens 102. With illumination, a cup holder 130, which is located while laterally being spaced from the lens 102, is well confirmed by the eye. Such a lighting device is disclosed in JP-A-9-272377.

In the lighting device 100, the lens 102, shaped like U in cross section, is disposed surrounding the front of the light emitting diode 101. A light emitting surface 105 of the lens 102 is flush with a side wall surface 115 of the console box. Light 120 horizontally emitted from the light emitting diode 101 is incident on a light receiving surface 106 of the lens 102 at a right angle, and introduced into the lens 102 while not being refracted at the light receiving surface 106. The light is not refracted also at a light emitting surface 105 of the lens 102, and as a result, it is radiated in the horizontal direction. Light 121 emitted in a downward slanted direction is incident on the light receiving surface 106 of the lens 102 at an acute angle, and is refracted upward at the light receiving surface 106 and introduced into the lens 102. The light having reached to the light emitting surface 105 is refracted downward at the light emitting surface 105, and radiated in a downward slanted direction.

A distribution of light radiated from the lighting device was investigated by the inventors of the present patent application. The results of our investigation were: a sufficient amount of light was radiated in the horizontal direction. Accordingly, the cup holder beside the lens 102 could clearly be viewed. The light radiated in the downward slanted direction was small in its amount. Accordingly, a lower part (bottom part) of the console box was unsatisfactorily viewed. Thus, the conventional lighting device cannot illuminate the interior of the console box over abroad range with a sufficient amount of light. In other words, a great difference is present between the amount of light emanating from the lens 102 in the horizontal direction and the amount of light emanating from it in the downward slanted direction.

Therefore, the conventional lighting device cannot illuminate a broad area within the console box uniformly.

Part of light 122 emitted from the light emitting diode 101 in the downward slanted direction is reflected at the lower end of the lens 102, and radiated from the lens surface 105 in an upward slanted direction. This light dazzles a passenger to give rise to a glare.

A possible approach to illuminate the lower part of the console box with a sufficient amount of light is to attach the lighting device 100 to the lower part of the console box. When this approach is employed, the cup holder is illuminated with an insufficient amount of light, however. The illumination of the inside of the console box over a broad range may be realized by increasing the number of lighting devices. This approach, however, causes the following problems. The number of required component parts is increased. An excessive amount of light is used for the illumination. As a result, the interior of the console box and its vicinal area as well will possibly be illuminated. Additionally, the work to adjust a layout of the lighting devices is essential. This is undesirable in the light of design and assembling.

An additional approach is to attach the lighting device 100 to the upper wall of the storage space, e.g., the glove box. This approach also fails to illuminate the inside of the glove box over a wide range. In particular, it can insufficiently illuminate the articles located at the inner part of the glove box.

SUMMARY OF THE INVENTION

Accordingly, an object of the present invention is to provide a lighting device capable of more uniform illumination over a broad range with light with a simple construction. Another object of the present invention is to provide a lighting device capable of efficiently illuminating a lower part (bottom part) or the inner part of a box-shaped container or the like. Still another object of the invention is to provide a lighting device little giving rise to dazzling and glaring.

To achieve at least one of the above objects, there is provided a lighting device attached to a wall, wherein the lighting device has LED light source and a lens, the LED light source is disposed while being confronted with one end part of the lens, the lens includes a light emitting surface arranged substantially parallel to the wall when the lighting device is attached to the wall, and a first light receiving surface, the first light receiving surface receives light that is emitted from the LED light source in a direction slanted with respect to the light emitting surface, and takes a concave surface configured such that a distance from the first light receiving surface to the light emitting surface increases from one end to the other end of the lens.

Light which is emitted from the LED light source while being slanted with respect to the light emitting surface, is refracted by the first light receiving surface and introduced into the lens. The first light receiving surface is not a flat surface parallel to the light emitting surface, but a concave surface configured such that a distance from the first light receiving surface to the light emitting surface increases from one end to the other end of the lens. Accordingly, light that is incident on the first light receiving surface is introduced into the lens at an incident angle and a refracting angle, which are smaller than in a case where the first light receiving surface is parallel to the light emitting surface. Accordingly, the light introduced is directed to a position closer to the other end of the lens on the light emitting surface than in the case where the first light receiving surface is parallel to the light emitting surface. And, an incident angle with respect to the light emitting surface is larger than in that case. As a result, the light is radiated outside through a position closer to the other end of the light emitting surface at a larger refracting angle.

Therefore, in attaching the lighting device of the invention to a container or the like, the lens may be mounted on the side wall of, for example, a console box in a state that one end of the lens is as the upper end and the other end of the lens is as the lower end. In this case, the lower part (bottom part) within the console box is effectively illuminated with light that is radiated outside from a position closer to the other end than the light emitting surface at a large refracting angle.

DETAILED DESCRIPTION OF THE PREFERRED EMBODIMENTS

The embodiments of the present invention, which are believed to be preferred, will be described with reference to the accompanying drawings.

Figure 1:
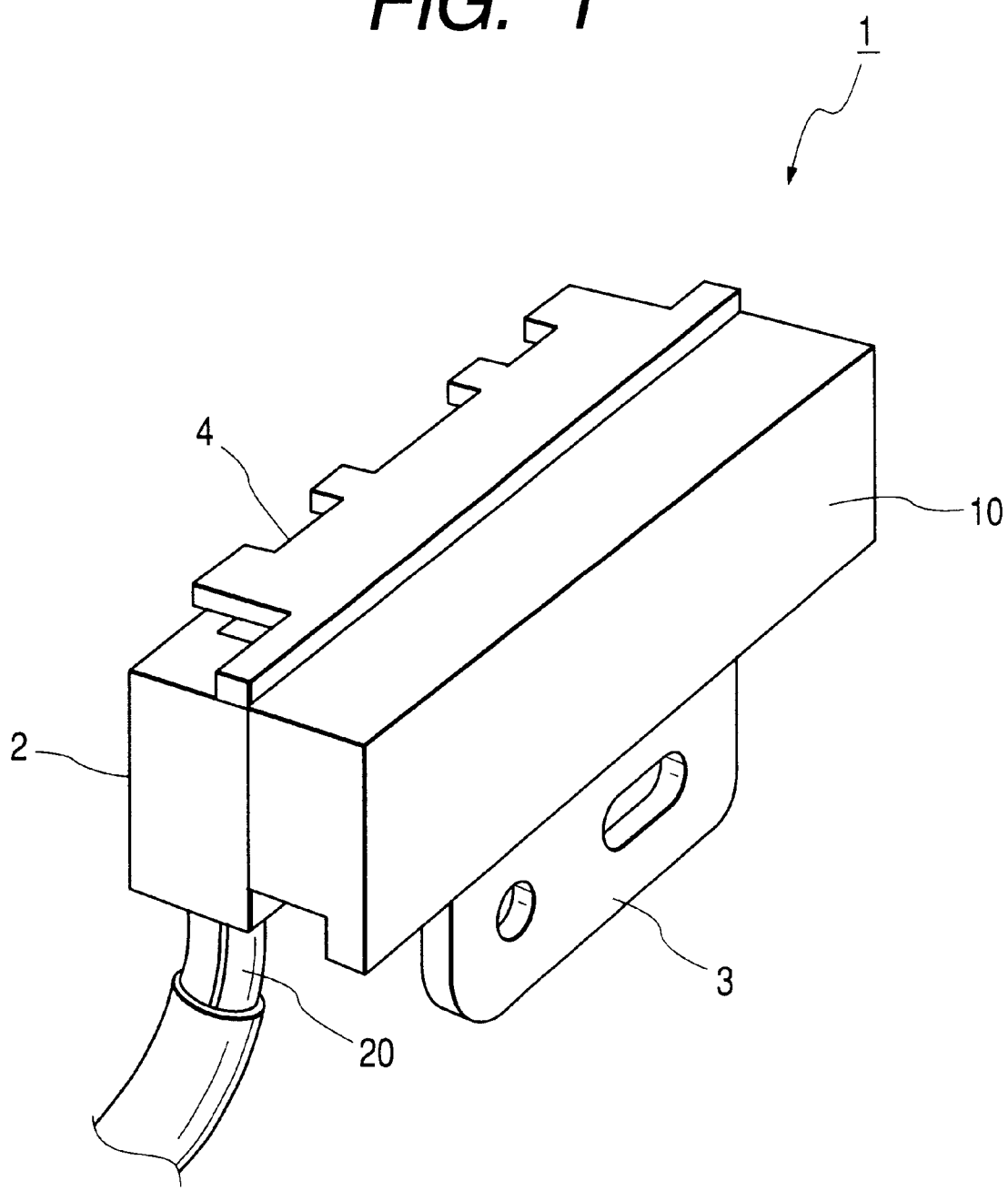
FIG. 1 is a perspective view showing a lighting device 1 which is an embodiment of the present invention.
Figure 7:
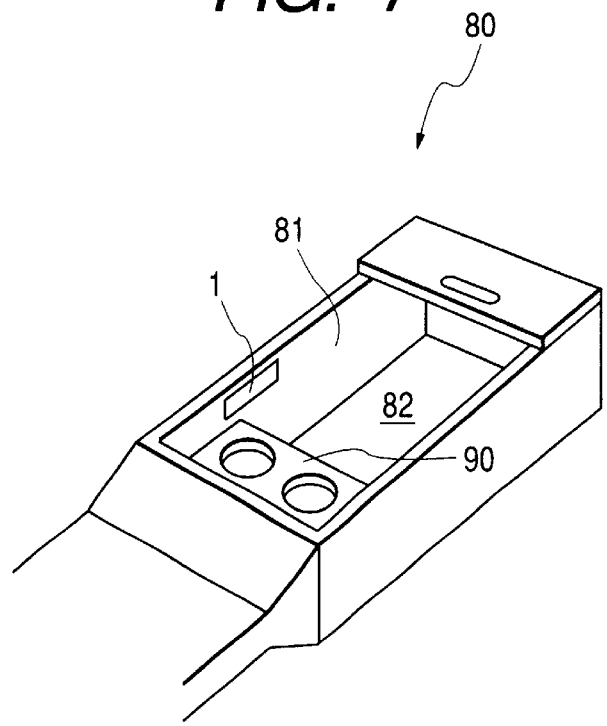
FIG. 7 is a view showing the lighting device 1 being attached to the wall surface of the console box 80.
Figure 8:
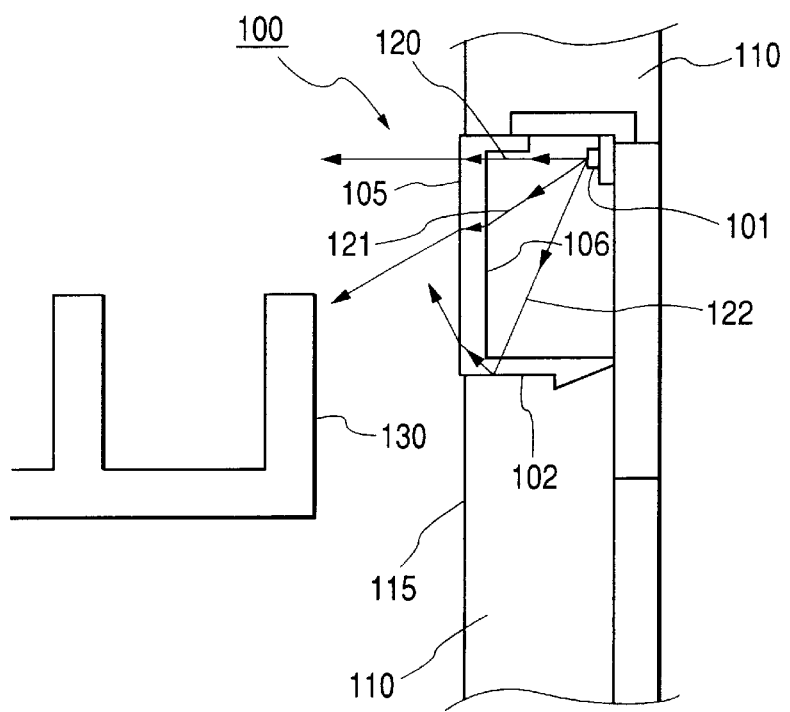
FIG. 8 is a view showing a conventional lighting device 100.

FIG. 1 is a perspective view showing a lighting device 1 which is an embodiment of the present invention. In use, the lighting device 1 may be attached to a storage box installed to the cabin of an automobile, such as a console box, a glove box, or an accessory box. And, it illuminates the interior of the storage box. In the embodiments to be described hereunder, the lighting device 1 is applied to the console box. As shown in FIG. 7, the lighting device 1 is attached to a wall surface 81 of a console box 80, and illuminates the interior of a cup holder 90 and the console box.

Figure 2:
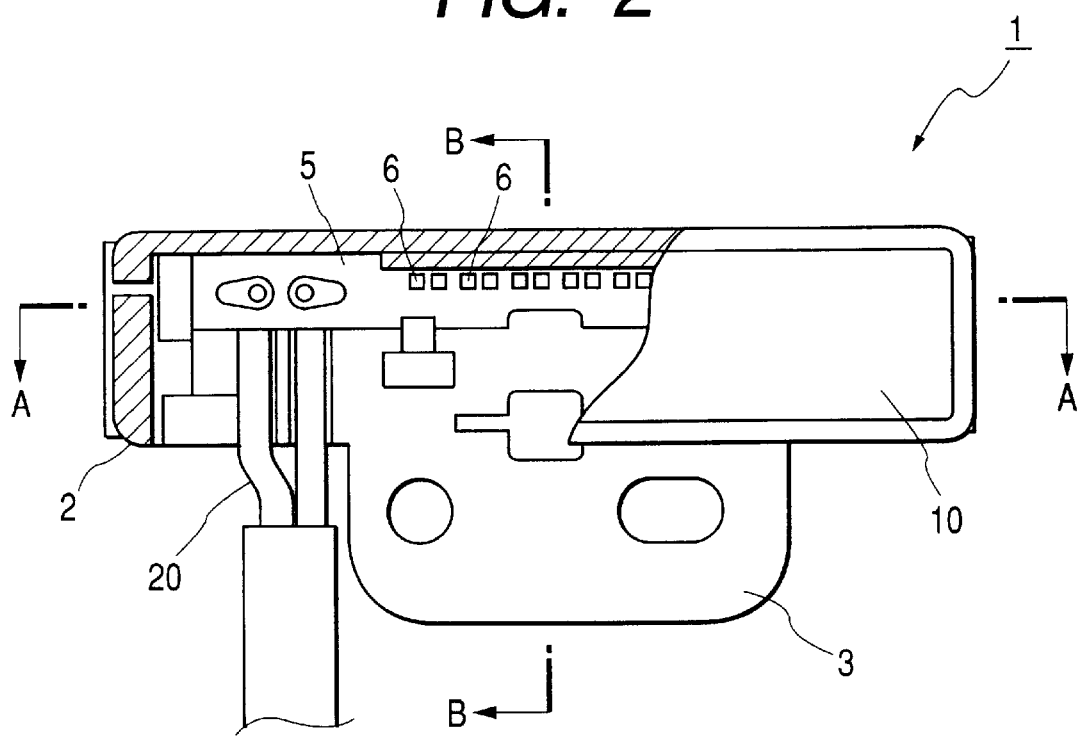
FIG. 2 is a front view, partly broken, showing the lighting device as viewed from a lens 10.
Figure 3:
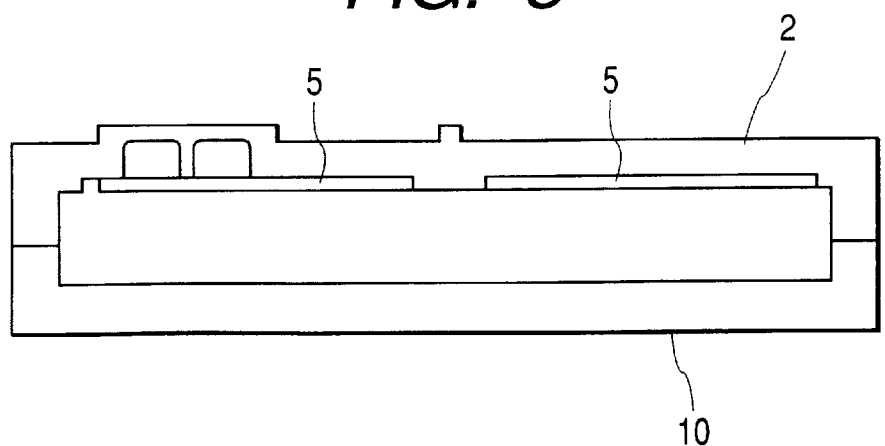
FIG. 3 is a cross sectional view taken on line A—A in FIG. 2.
Figure 4A:
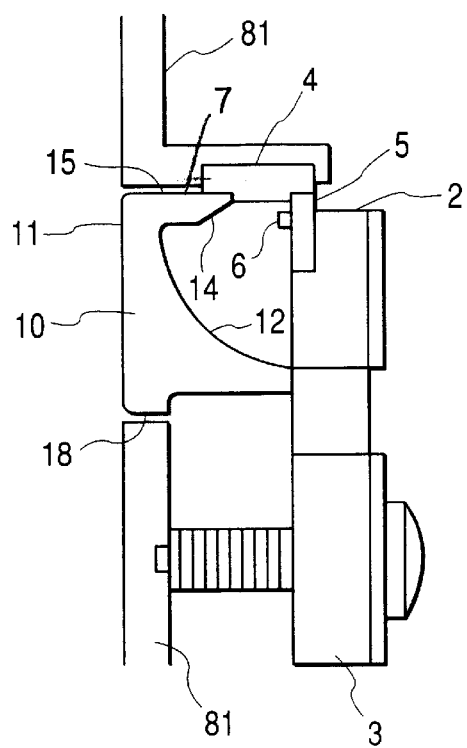
FIG. 4A is a cross sectional view taken on line B—B in FIG. 2, the lighting device being attached to a wall surface 81 of a console box 80.
Figure 4B:
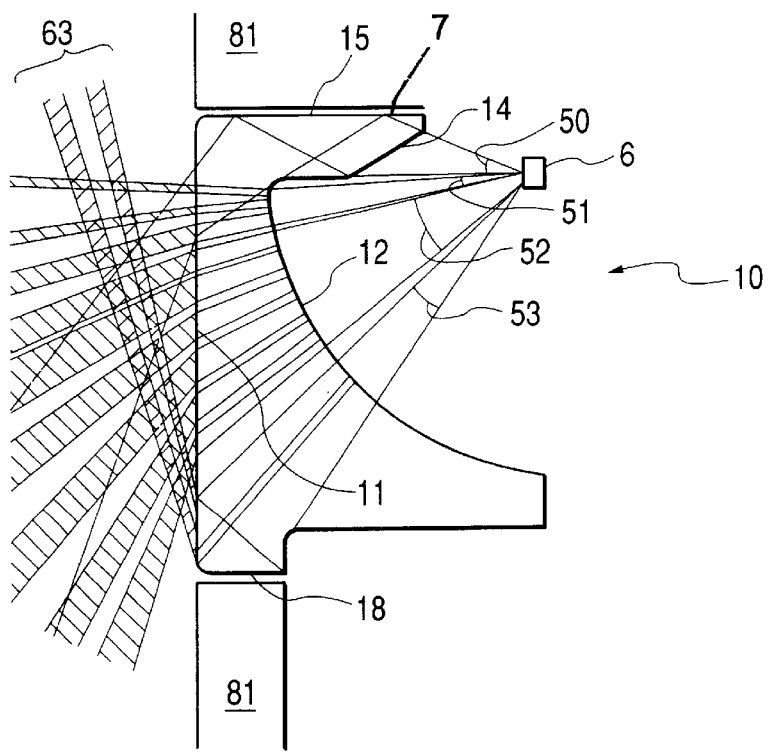
FIG. 4B shows an optical path chart of the lighting device 1.
Figure 5A:
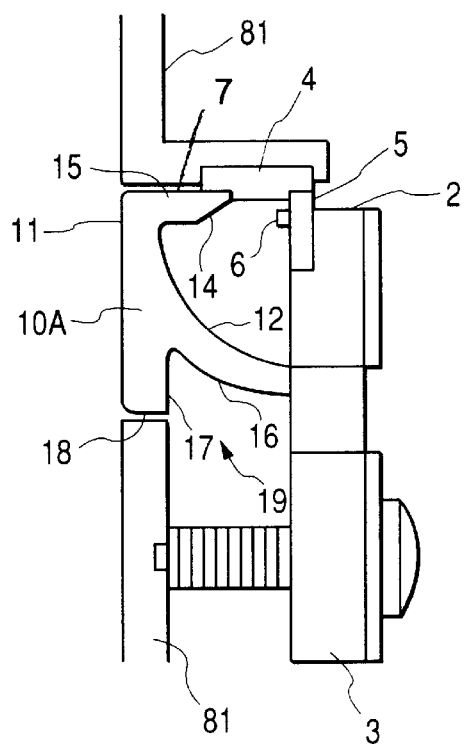
FIG. 5A is a cross sectional view showing another lighting device using a lens 10A for the lens 10, taken on line B—B as in FIG. 4A, the lighting device being attached to the wall surface 81 of the console box 80.
Figure 5B:
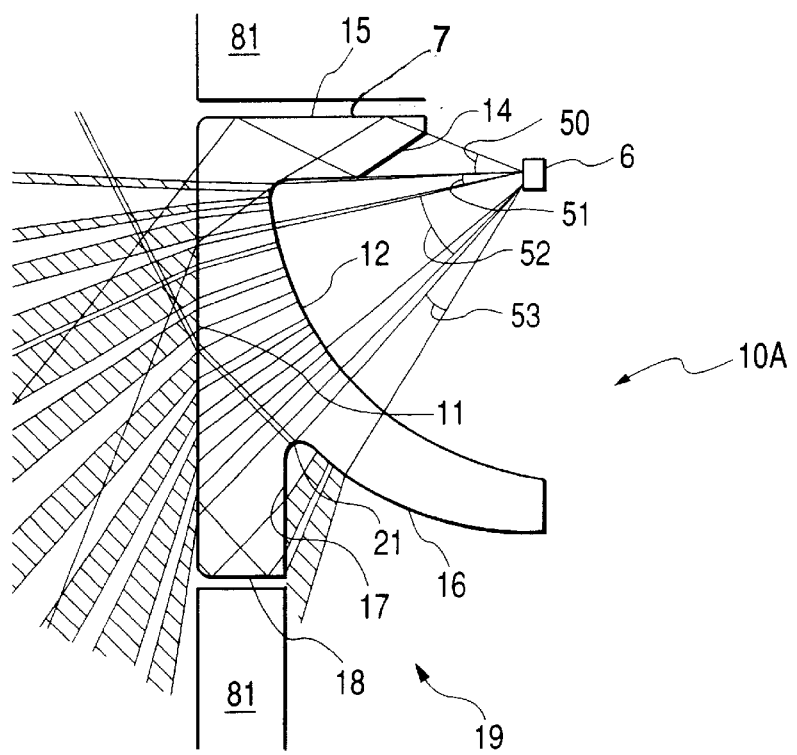
FIG. 5B shows an optical path chart of the lighting device in FIG. 5A.
Figure 6A:
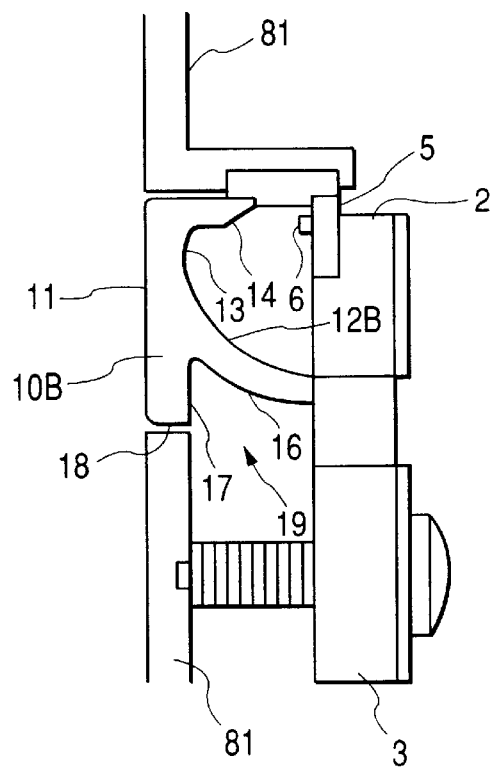
FIG. 6A is a cross sectional view showing yet another lighting device using a lens 10B for the lens 10, taken on line B—B as in FIG. 4A, the lighting device being attached to the wall surface 81 of the console box 80.
Figure 6B:
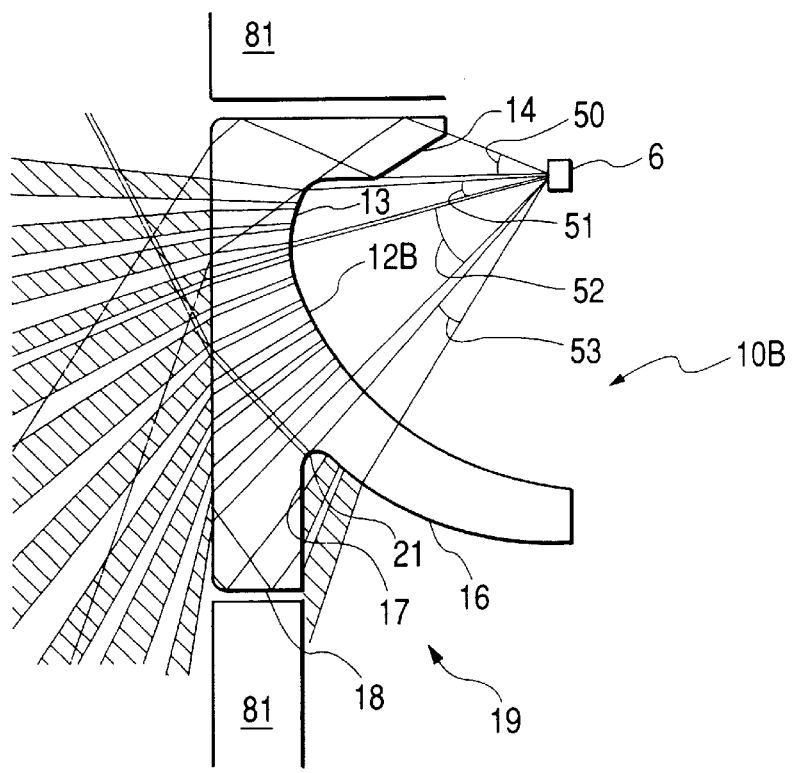
FIG. 6B shows an optical path chart of the lighting device in FIG. 6A.

FIG. 2 is a front view, partly broken, showing the lighting device 1 as viewed from a lens 10. FIG. 3 is a cross sectional view taken on line A—A in FIG. 2. FIG. 4A is a cross sectional view taken on line B—B in FIG. 2, the lighting device being attached to a wall surface 81 of a console box 80. FIG. 4B shows an optical path chart of the lighting device 1. FIG. 5A is a cross sectional view showing another lighting device using a lens 10A for the lens 10, taken on line B—B as in FIG. 4A, the lighting device being attached to the wall surface 81 of the console box 80. FIG. 5B shows an optical path chart of the FIG. 5A lighting device. FIG. 6A is a cross sectional view showing yet another lighting device using a lens 10 for the lens 10, taken on line B—B as in FIG. 4A, the lighting device being attached to the wall surface 81 of the console box 80. FIG. 6B shows an optical path chart of the FIG. 6A lighting device.

A construction of the lighting device 1 and how the lighting device illuminates the interior of the console box will be described with reference to the related drawings.

The lighting device 1 is constructed with a housing 2, a board 5 on which LEDs 6 are mounted, and a lens 10.

The housing 2 is shaped like a box, formed by molding process using a resin such as polypropylene for the mold resin material. The housing 2 is preferably made of a material which rejects the transmitting therethrough and the reflecting thereon of light from the LEDs 6. An example of such a material is a black material. Use of such a material prevents light from leaking from the housing 2, and from scattering by scatter reflection on the housing 2. The housing 2 is provided with mounting parts 3 and 4 by which the lighting device 1 is firmly attached to the wall surface of the console box.

A board 5 is located within the housing 2. The board 5 is disposed such that the LEDs 6 mounted thereon face the upper end of the lens 10. Those LEDs 6 mounted on the board 5 are linearly arrayed. Additionally, rectifying elements, resistors and others, which are not shown, are mounted on the board. An alternator and a battery supply electric power to those LEDs 6, through a lead wire 20 coupled thereto. The number of LEDs 6 and their array are not limited to those of the embodiment, but may be selected in accordance with a kind of the storage box to which the lighting device is applied, and a degree of illumination required.

The LEDs 6 are of the chip type in the embodiment. Colors of lights emitted from the LEDs 6 may be appropriate one, such as red, blue, green or a medium tone color prepared by appropriately blending them, or white color. A tranquil color, e.g., amber, is preferable for the color. A combination of LEDs emitting different color lights may also be used.

Use of the LEDs for the light source brings about the following advantages. The LED has a good light emission efficiency. Accordingly, it can illuminate the inside of the storage box with less consumption of electric power. In this case, the amount of heat generated is small. In this respect, the LED is suitable for the continuous and long-time illumination. Specifically, when it is combined, in operation, with a small lamp, it may be continuously operated to emit light at night. If so done, an advantage is created such that there is no need of using an additional switch for controlling a lighting state for the lighting device.

Further, the LED's lifetime is longer than the light bulb, and this feature is preferable for its maintenance.

The lens 10 is assembled to the housing 2 in a state that it covers the front of the lighting device 1. It permits light emitted from the LEDs 6 to transmit therethrough, and refracts part of the light to exterior. The lens 10 is made of a light transmission material, such as acrylic resin, polycarbonate resin or glass. A lens 10 configured as desired may be formed by a known die molding technique using any of those materials for the mold resin material.

Subsequently, a configuration of the lens 10 will be described with reference to FIG. 4. As stated already, FIG. 4A is a cross sectional view taken on line B—B in FIG. 2. In the figure, the lighting device 1 is attached to a wall surface 81 of a console box 80.

The lens 10 is shaped like U in cross section. The front surface of the lens 10 is a flat, light emitting surface 11. The side of the lens, which is confronted with the LEDs 6, is a first light receiving surface 12. The first light receiving surface 12 is curved such that it gradually increases a distance from it to the light emitting surface 11 from the upper end to the lower end of the lens 10. In the embodiment, the curved, first light receiving surface 12 is uniform at curvature from the upper end to the lower end of the lens 10. If required, the first light receiving surface 12 may have a different curvature or curvatures at a part or parts thereof. For instance, the first light receiving surface 12 may be configured such that a curvature thereof increases in a direction from the upper end to the lower end of the lens 10, then a distance from the LEDs 6 to the first light receiving surface 12 increases in a direction from the upper end to the lower end of the lens 10.

Further, in the embodiment, the cross section of the first light receiving surface 12 is shaped to form a part of an arc developed around a light emitting point of the LED. In this case, if only a cross section as shown in the FIGS. 4A and 4B is considered, light emitted from the LEDs 6 is incident on the first light receiving surface 12 without forming incident angle thus refracted angle at any position of the first light receiving surface 12.

A part of the upper end of the lens 10, which forms a second light receiving surface 14, is slanted such that a distance from it to the light emitting surface 11 increases from the lower end to the upper end of the lens 10. An inclination of the second light receiving surface 14 is selected so as to refract most of the light, which is introduced into the lens 10 through the second light receiving surface 14, to a surface 15 of the upper end of the lens 10. The surface of the second light receiving surface 14 is processed for light diffusion. The light diffusion process is not limited to specific ones. An example of it is to form a plurality of embosses on the slanted surface. Another example is to roughen the slanted surface.

As shown, the LEDs 6 are disposed such that it is substantially aligned and confronted with the second light receiving surface 14.

The surface 15 of the upper end of the lens 10 is flat, and a light reflecting film 7 may be formed on the flat surface. The film 7 may be formed by vapor deposition or sputtering process using metallic material.

How the lighting device 11 radiate light will be described with reference to FIG. 4B. For ease of explanation, lights emitted from the LEDs 6 or radiated outside are divided into light rays having different light advancing directions, and those light components are hatched.

Light 50 emitted form the LEDs 6 in an upward slanted direction is introduced into the lens 10, through the second light receiving surface 14 of the lens 10, and reaches the flat surface 15 of the upper end of the lens 10. The light is reflected on the flat surface 15 to the downward slanted direction. Subsequently, it reaches the light emitting surface 11, and is directed downward and radiated outside. Most of the light that is incident on the second light receiving surface 14 of the lens 10 is refracted toward the flat surface 15 of the upper end of the lens 10, as stated above. Therefore, the light is efficiently radiated outside. As the second light receiving surface 14 is light diffusion processed, light that is radiated outside from the light emitting surface 11 are uniformly distributed over an area extending downward with respect to the light emitting surface 11, that is, it is not localized in light distribution. Accordingly, the irregular illumination is lessened.

Lights 51 and 52 are incident on the first light receiving surface 12 at almost right angles, and introduced into the lens 10 while keeping their advancing directions. The lights reach the light emitting surface 11, refracted in accordance with incident angles with respect to the light emitting surface 11, and are radiated outward. At this time, the light 51 is radiated in the horizontal direction, and the light 52 is radiated in the downward slanted direction. Light 52 that is emitted from the LEDs 6 in the downward direction is introduced into the lens 10, through the first light receiving surface 12. Accordingly, the light 52 is introduced into the lens 10 while not being changed in its advancing direction. If the first light receiving surface 12 is flat, not curved, and parallel to the light emitting surface 11, the light 52 is directed upward when it enters the lens through the parallel surface. In this case, the light is introduced into the lens and reaches a position on the light emitting surface 11. This position is higher than that in the lens structure using the curved first light receiving surface 12. Further, an incident angle of the light on the light emitting surface 11 is smaller than in the latter. Accordingly, a light advancing direction of the radiated light is directed upward. Thus, the first light receiving surface 12 is provided, and the light 52 that is emitted from the LEDs 6 in the downward slanted direction is introduced into the lens 10 through the first light receiving surface, and finally the light radiated from the light emitting surface 11 advances in the downward slanted direction. In other words, the lighting device 1 is capable of effectively illuminating an area in front of and lower than the mounting position of the lighting device.

The light 53 is introduced into the lens 10 through the first light receiving surface 12; part of it is reflected on bottom surface 18 of the lens 10; it is refracted at the light emitting surface 11 to the upward slanted direction; and it is radiated outside in this direction as light 63.

A lighting device using a lens 10A in place of the lens 10 will be described with reference to FIG. 5. In the figure, like reference numerals are used for designating like or equivalent portions of the lens 10.

As shown in FIG. 5A, the lens 10A includes a wedge-shaped cut 19 formed at the lower end portion. A curved surface 16 curved along the first light receiving surface 12 and a flat surface 17 define the wedge-shaped cut 19 in configuration.

A surface of the curved surface 16 and a surface of a curved surface 21 interconnecting the curved surface 16 and the flat surface 17 are processed for light diffusion, similarly to the second light receiving surface 14. The light diffusion process is not limited to specific ones. An example of it is to form a plurality of embosses on the slanted surfaces or to roughen the same.

A light distribution of light radiated from the lighting device using the lens 10A will be described with reference to FIG. 5B. Lights 50 to 52 are radiated outward as by the lighting device using the lens 10. Accordingly, the lighting device 1 is capable of effectively illuminate an area in front of and lower than the mounting position of the lighting device 1, as by the lighting device using the lens 10.

Light 53 is introduced into the lens 10A through the first light receiving surface 12, and part of it is radiated outside from the curved surface 16. Part of the radiated light reaches the flat surface 17, and introduced into the lens 10A. That light is reflected on the bottom surface 18, and most of the light is totally reflected by the reflecting surface 11. Part of the light is radiated outside in the upward slanted direction, from the reflecting surface 11. As the surface of the curved surface 16 is light diffusion processed, light passing through the curved surface 16 is diffused, so that an amount of light radiated in the upward slanted direction is reduced.

Part of the light 53 that is introduced into the lens 10A through the first light receiving surface 12 is reflected by the curved surface 21, and then radiated from the reflecting surface 11 in the upward slanted direction. As the surface of the curved surface 21 is light diffusion processed, the light is diffused when it is reflected by the curved surface 21. As a result, an amount of light radiated to the upward slanted direction is reduced.

As described above, the lens 10 receives the light 53 and radiates the light 63 in the upward slanted direction. Meanwhile the lens 10A remarkably reduces the amount of the light radiated in the upward slanted direction since the wedge-shaped cut 19 is provided at the lower end part thereof. As a result, there is a less chance that the area around the storage box is unnecessarily illuminated, and that the glaring and dazzling occur.

A lighting device using a lens 10B will be described with reference to FIG. 6. In the figure, like reference numerals will be used for designating like or equivalent portions of the lens 10A.

The lens 10B includes a first light receiving surface 12B and a third light receiving surface 13, both being confronted with the LEDs 6. The third light receiving surface 13 extends from the upper end of the first light receiving surface 12B, and has a slant different from that of the first light receiving surface 12B. Specifically, the first light receiving surface 12B is a curved surface which increases a distance from it to the reflecting surface 11 from the upper end to the lower end. The third light receiving surface 13 is a curved surface continuous to the upper end of the first light receiving surface 12B, and increases a distance from it to the reflecting surface 11 from the lower end to the upper end. As illustrated, in the lens 10B, a curvature of the first light receiving surface 12B is equal to that of the third light receiving surface 13. If required, the curvatures of those surfaces may be different from each other. Further, in the lens 10B, the first and third light receiving surfaces 12B and 13 are each curved at an equal curvature. If necessary, each of those surfaces may be curved while changing its curvature at a part or parts of its extent.

In lens design, a slant and a curvature of each of the first light receiving surface 12B and the third light receiving surface 13 are selected preferably such that the reflecting surface 11 radiates outside light over a broad range defined between a substantially horizontal direction to a downward slanted direction, and that the radiated light is uniformly distributed at intensity over the range.

How the lens 10B radiates light will be described hereunder. Lights 50, 52 and 53 are radiated as by the lens 10A. Light 51 is first introduced into the lens 10B through the third light receiving surface 13. Light that is introduced into the lens 10B through an upper end part of the third light receiving surface 13, is refracted somewhat upward. Light that is introduced into the lens 10B through a lower end part of the third light receiving surface 13, is refracted somewhat downward. Light that will be introduced into the lens 10B through a middle part of the third light receiving surface 13, is incident on the third light receiving surface 13 at a right angle. Accordingly, it is introduced into the lens 10B without any refraction. In this way, the light introduced into the lens 10B is radiated outside in a substantially horizontal direction, from the reflecting surface 11, as illustrated. Thus, in the lens 10B, an amount of light radiated outside in the substantially horizontal direction is increased, with provision of the third light receiving surface 13. When observing a light distribution of light radiated from the lens 10B as a whole, it is seen that the light radiated in the horizontal direction and the lights radiated in the downward slanted direction based on the lights 50, 52 and 53 are well balanced in distribution. Thus, the lighting device using the lens 10B is capable of illuminating a broad range defined between the substantially horizontal direction and the downward slanted direction at a uniform light intensity.

As seen from the foregoing description, the lighting device 1 of the invention is capable of illuminating an area in front of the device over a broad range defined between the horizontal direction and the downward slanted direction. When attached to the side wall of the console box, it is able to effectively illuminate a broad area within the console box. Particularly, when the lens 10B is employed, the lighting device is able to illuminate a broad area at a uniform amount of light. While the lighting device is applied to the console box in the embodiments mentioned above, it may be applied to a glove box, a small article storage box, ash tray or any other storage box. In this case, the lighting device is attached to the side wall or the upper wall. Where the lighting device is attached to the upper wall of a glove box such that the light emitting surface of the lighting device is flush with the upper wall, the lighting device illuminates the bottom surface of the glove box, which is located on the front of the light emitting surface of the device, or an area located downward and in front of the light emitting surface of the device, namely, the inner part of the glove box.

It should be understood that the present invention is not limited to the embodiments mentioned above, but may variously be modified, changed and altered within the true spirits and scope of the invention.

What is claimed is:

1. A light device for illumination, comprising:
a LED light source substantially confronting to one end of a lens;
said lens including a light emitting surface arranged substantially parallel to a wall when said lighting device is attached to said wall and a first light receiving surface confronting to said LED light source for receiving light which is emitted from said LED light source and is incident in a direction slanted with respect to said light emitting surface;
wherein said first light receiving surface is provided with a concave surface such that a distance from said first light receiving surface to said light emitting increases in a direction from said one end to the other end of said lens.

2. A lighting device according to claim 1,
wherein said first light receiving surface receives light from said LED light source and introduces said light into said lens so as not to refract said light in the direction from said other end to said one end of said lens.

3. A lighting device according to claim 1,
wherein a cross section of said first light receiving surface is shaped to form substantially an arc developed around said LED light source.

4. A lighting device according to claim 1, wherein said lens includes further a second light receiving surface formed on said one end of said lens so as to confront to said LED light source and a reflecting surface defined by said one end of said lens, said second light receiving surface being slanted such that a distance from said second light receiving surface to said light emitting surface increases from said other end to said one end of said lens, wherein light introduced into said lens through said second light receiving surface is refracted toward said one end of said lens, reflected at said reflecting surface, and radiated from said light emitting surface.

5. A lighting device according to claim 4, wherein said second light receiving surface is light diffusion processed.

6. A lighting device according to claim 4, wherein a light reflecting film is provided on said reflecting surface.

7. A lighting device according to claim 1, wherein a wedge-shaped cut is formed in said other end of said lens, and defined by a flat surface formed along said light emitting surface and a curved surface formed along said first light receiving surface.

8. A lighting device according to claim 7, wherein said curved surface partially defining said wedge-shaped cut is light diffusion processed.

9. A lighting device according to claim 1, wherein said lens includes further a third light receiving surface formed continuously to said first light receiving surface as a concave surface, and said third light receiving surface is configured such that a distance from said third light receiving surface to said light emitting surface increases from said other end to said one end of said lens, said third light receiving surface.

* * * * *